United States Patent
Patton

(10) Patent No.: US 10,324,935 B1
(45) Date of Patent: Jun. 18, 2019

(54) PRESENTING EVENT INTELLIGENCE AND TRENDS TAILORED PER GEOGRAPHIC AREA GRANULARITY

(71) Applicant: Banjo, Inc., Park City, UT (US)

(72) Inventor: Damien Patton, Park City, UT (US)

(73) Assignee: Banjo, Inc., Park City, UT (US)

( * ) Notice: Subject to any disclaimer, the term of this patent is extended or adjusted under 35 U.S.C. 154(b) by 0 days.

(21) Appl. No.: 16/121,762

(22) Filed: Sep. 5, 2018

Related U.S. Application Data

(60) Provisional application No. 62/628,866, filed on Feb. 9, 2018, provisional application No. 62/654,277, filed on Apr. 6, 2018, provisional application No. 62/654,274, filed on Apr. 6, 2018, provisional application No. 62/660,215, filed on Apr. 19, 2018, provisional application No. 62/664,001, filed on Apr. 27, 2018.

(51) Int. Cl.
*G06F 7/00* (2006.01)
*G06F 17/30* (2006.01)
*G06F 16/2457* (2019.01)
*G06N 20/00* (2019.01)
*G06F 16/29* (2019.01)
*G06F 16/248* (2019.01)

(52) U.S. Cl.
CPC ...... *G06F 16/24575* (2019.01); *G06F 16/248* (2019.01); *G06F 16/29* (2019.01); *G06N 20/00* (2019.01)

(58) Field of Classification Search
CPC .. G06F 16/24575; G06F 16/248; G06F 16/29; G06N 20/00
See application file for complete search history.

(56) References Cited

U.S. PATENT DOCUMENTS 8,161,504 B2 4/2012 Newell
8,208,798 B2 6/2012 Jung et al.
(Continued)

OTHER PUBLICATIONS

Office Action received in U.S. Appl. No. 16/121,917, dated Nov. 2, 2018, 20 pages.
(Continued)

*Primary Examiner* — Azam M Cheema
(74) *Attorney, Agent, or Firm* — Michael B. Dodd

(57) ABSTRACT

The present invention extends to methods, systems, and computer program products for presenting event intelligence and trends tailored per geographic area granularity. Event related data can be combined with information from other domains to enable intelligent decision making within those domains. Responsive to user commands, graphical presentation can be tailored to a geographic granularity and can vary between geographic granularities. Event related information and other information for a defined area as well as adjacent areas can be at least partially summarized based on geographic granularity. At least partially summarizing data for currently presented areas as well as adjacent areas reduces resource consumption when moving between presented areas, for example, in a map. The level of summarization can be a tailored to a selected geographic granularity. As such, overall presented graphical data (e.g., total number of icons) can be relatively stable, and possibly tuned to available computing resources.

17 Claims, 7 Drawing Sheets

(56) References Cited

U.S. PATENT DOCUMENTS

| | | |
|---|---|---|
| 8,380,050 B2 | 2/2013 | Kummer |
| 8,396,467 B2 | 3/2013 | Bonnefoy et al. |
| 8,782,041 B1 | 7/2014 | Daniel |
| 8,938,089 B1 | 1/2015 | Postelnicu et al. |
| 9,106,804 B2 | 8/2015 | Roberts et al. |
| 9,158,974 B1 | 10/2015 | Laska et al. |
| 9,230,250 B1 | 1/2016 | Parker et al. |
| 9,324,093 B2 | 4/2016 | Setty et al. |
| 9,449,229 B1 | 9/2016 | Laska et al. |
| 9,466,196 B2 | 10/2016 | Smith et al. |
| 9,466,197 B2 | 10/2016 | Hildick-Pytte |
| 9,501,915 B1 | 11/2016 | Laska et al. |
| 9,609,380 B2 | 3/2017 | Laska et al. |
| 9,613,068 B2 | 4/2017 | Tsirogiannis et al. |
| 9,680,919 B2 | 6/2017 | McDaid et al. |
| 9,699,523 B1 | 7/2017 | Cronin et al. |
| 9,703,827 B2 | 7/2017 | Clark et al. |
| 9,753,913 B1 | 9/2017 | Kursun et al. |
| 9,858,322 B2 | 1/2018 | Theimer et al. |
| 9,880,769 B2 | 1/2018 | Chen et al. |
| 9,898,542 B2 | 2/2018 | Hayden |
| 9,940,580 B2 | 4/2018 | Faith et al. |
| 9,992,248 B2 | 6/2018 | Fox et al. |
| 10,034,029 B1 | 7/2018 | Barua et al. |
| 10,043,006 B2 | 8/2018 | Puri et al. |
| 10,043,551 B2 | 8/2018 | Anderson et al. |
| 10,078,537 B1 | 9/2018 | Nanda et al. |
| 2005/0183143 A1 | 8/2005 | Anderholm et al. |
| 2006/0235833 A1 | 10/2006 | Smith et al. |
| 2006/0267783 A1 | 11/2006 | Smith |
| 2010/0166309 A1 | 7/2010 | Hull |
| 2011/0040760 A1 | 2/2011 | Fleischman et al. |
| 2011/0311140 A1 | 12/2011 | Urbach et al. |
| 2012/0023245 A1 | 1/2012 | Mouquet et al. |
| 2012/0259842 A1 | 10/2012 | Oman et al. |
| 2013/0006627 A1 | 1/2013 | Guthery et al. |
| 2013/0083036 A1 | 4/2013 | Cario et al. |
| 2013/0214925 A1 | 8/2013 | Weiss |
| 2014/0025781 A1 | 1/2014 | Ye et al. |
| 2014/0067951 A1 | 3/2014 | Sheinfeld |
| 2014/0088744 A1 | 3/2014 | Levien et al. |
| 2014/0328570 A1 | 11/2014 | Cheng et al. |
| 2015/0095333 A1* | 4/2015 | Porpora ............ G06F 17/30699 707/737 |
| 2015/0220835 A1 | 8/2015 | Wilson et al. |
| 2015/0294233 A1 | 10/2015 | Aultman et al. |
| 2016/0139242 A1 | 5/2016 | Dupray et al. |
| 2016/0192166 A1 | 6/2016 | deCharms |
| 2016/0267144 A1 | 9/2016 | Manimaran |
| 2016/0283860 A1 | 9/2016 | Pycock et al. |
| 2017/0011053 A1 | 1/2017 | Hubbard et al. |
| 2017/0032138 A1 | 2/2017 | Navda et al. |
| 2017/0115648 A1 | 4/2017 | Nixon et al. |
| 2017/0139393 A1 | 5/2017 | Boss et al. |
| 2017/0139956 A1 | 5/2017 | Qiao et al. |
| 2017/0142200 A1 | 5/2017 | Kodner et al. |
| 2017/0180944 A1 | 6/2017 | Bhatt |
| 2017/0257654 A1 | 9/2017 | Branch et al. |
| 2017/0318336 A1 | 11/2017 | Hackett et al. |
| 2017/0366896 A1 | 12/2017 | Adsumilli et al. |
| 2018/0101595 A1 | 4/2018 | Bastide et al. |
| 2018/0172454 A1 | 6/2018 | Ghadiok et al. |
| 2018/0176607 A1 | 6/2018 | Shaw et al. |
| 2018/0192158 A1 | 7/2018 | Smith et al. |
| 2018/0268868 A1 | 9/2018 | Salokannel et al. |
| 2018/0276054 A1 | 9/2018 | Furuichi et al. |
| 2018/0287797 A1 | 10/2018 | Banerjee et al. |
| 2018/0300124 A1 | 10/2018 | Malladi et al. |
| 2018/0313798 A1 | 11/2018 | Chokshi et al. |

OTHER PUBLICATIONS

Office Action received in U.S. Appl. No. 16/131,637, dated Nov. 28, 2018, 37 pages.

Office Action received in U.S. Appl. No. 16/106,530, dated Oct. 26, 2018, 15 pages.

Office Action received in U.S. Appl. No. 16/038,537, dated Oct. 19, 2018, 10 pages.

Office Action received in U.S. Appl. No. 16/106,436, dated Nov. 8, 2018, 15 pages.

Office Action received in U.S. Appl. No. 16/101,208, dated Nov. 14, 2018, 15 pages.

Office Action received in U.S. Appl. No. 16/121,847, dated Nov. 23, 2018, 39 pages.

\* cited by examiner

PRESENTING EVENT INTELLIGENCE AND TRENDS TAILORED PER GEOGRAPHIC AREA GRANULARITY

CROSS-REFERENCE TO RELATED APPLICATIONS

This application claims the benefit of U.S. Provisional Patent Application Ser. No. 62/628,866, entitled "Multi Source Validation", filed Feb. 9, 2018, which is incorporated herein in its entirety. This application claims the benefit of U.S. Provisional Patent Application Ser. No. 62/654,277, entitled "Validating Possible Events With Additional Signals", filed Apr. 6, 2018, which is incorporated herein in its entirety. This application claims the benefit of U.S. Provisional Patent Application Ser. No. 62/654,274, entitled "Detecting Events From Multiple Signals", filed Apr. 6, 2018, which is incorporated herein in its entirety. This application claims the benefit of U.S. Provisional Patent Application Ser. No. 62/660,215, entitled "Combining Geohash Data With Other Datasets And Identifying Trends in Geohash Data To Increase Intelligence", filed Apr. 19, 2018, which is incorporated herein in its entirety. This application claims the benefit of U.S. Provisional Patent Application Ser. No. 62/664,001, entitled "Normalizing Different Types Of Ingested Signals Into A Common Format", filed Apr. 27, 2018, which is incorporated herein in its entirety.

This application is related to U.S. Provisional Patent Application Ser. No. 62/667,616, entitled "Normalizing Different Types Of Ingested Signals Into A Common Format", filed May 7, 2018, which is incorporated herein in its entirety.

BACKGROUND

1. Background and Relevant Art

GIS and other data systems are commonly used for a variety of services, including through online and mobile devices. These systems typically enable a user to locate desired information (data) by inputting a geographic region of interest. For example, such systems enable a user to identify real estate listings in a desired geographic area. In some cases, these systems also enable a user to interact with a map to locate data of interest. In addition to property specific information, these systems can provide some basic information about associated geographic areas, including information related to schools, public transportation, property tax, community, utilities, etc.

Many state and local governments fund and maintain economic development organizations (EDOs), which serve to promote commercial development and other economic opportunities according to assigned territories. These entities often market their respective locations and services to businesses and people in an attempt to garner investments in their area. These entities can also offer relevant information about promoted areas graphically as well as through mobile applications.

Other government and non-government entities can also offer information about geographic areas within their areas of responsibility, including insurance, actuarially services, etc.

Prospective home buyers, insurance companies, other businesses etc. can use information about geographic areas contained in these and other types of data systems to make decisions.

BRIEF SUMMARY

Examples extend to methods, systems, and computer program products for presenting event intelligence and trends tailored per geographic area granularity.

Event related data can be combined with information from other domains to enable more intelligent decision making within those domains. Combined data can be graphically presented at a unifying configurable interface. Graphically presenting event related information in combination with other information at a unifying configurable interface minimizes switching focus between different applications.

Responsive to user commands, geographic granularity can be adjusted to meaningfully present event related information integrated with other information. Graphical presentation can be tailored to a selected geographic granularity and can vary between selected geographic granularities. In one aspect, event related information and other information for a defined area is at least partially summarized prior to presentation. Event related information and other information for adjacent areas can also be at least partially summarized. Adjacent areas can be areas a user can move focus to but that are not necessarily selected for current presentation (e.g., areas left, right, above, below, etc., a presented area). As such, event related information and other information can be at least partially pre-summarized (pre-processed) in preparation for possible presentation.

At least partially summarizing data for currently presented areas as well as adjacent areas reduces resource consumption when moving between presented areas, for example, in a map. The level of summarization can be a tailored to a selected granularity. Event related information and other information associated with larger geographic areas can be more summarized than event related information and other information associated with smaller geographic areas.

As such, overall presented graphical data (e.g., total number of icons) can be relatively stable, and possibly tuned to available computing resources. Maintaining a stable amount of graphical data minimizes possible bogging down of and/or overloading graphical capabilities, for example, when transitioning from a more granular map view to a less granular map view. Accordingly, presentation of event related information and other information can be seamlessly (and efficiently) transitioned when viewing changes between different geographic granularities ranging from a state, to a county, to a city, to a neighborhood, to a street, to an individual address, etc.

In other aspects, event trends are computed and presented. Presentation of event trends can be similarly tailored to geographic granularity to regulate the amount of graphical data and minimize possible bogging down of and/or overloading graphical capabilities. Tailoring presentation of event trends can include varying a level of summarization based on geographic granularity.

In one aspect, event trends are presented along with event related data and domain data on a map.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
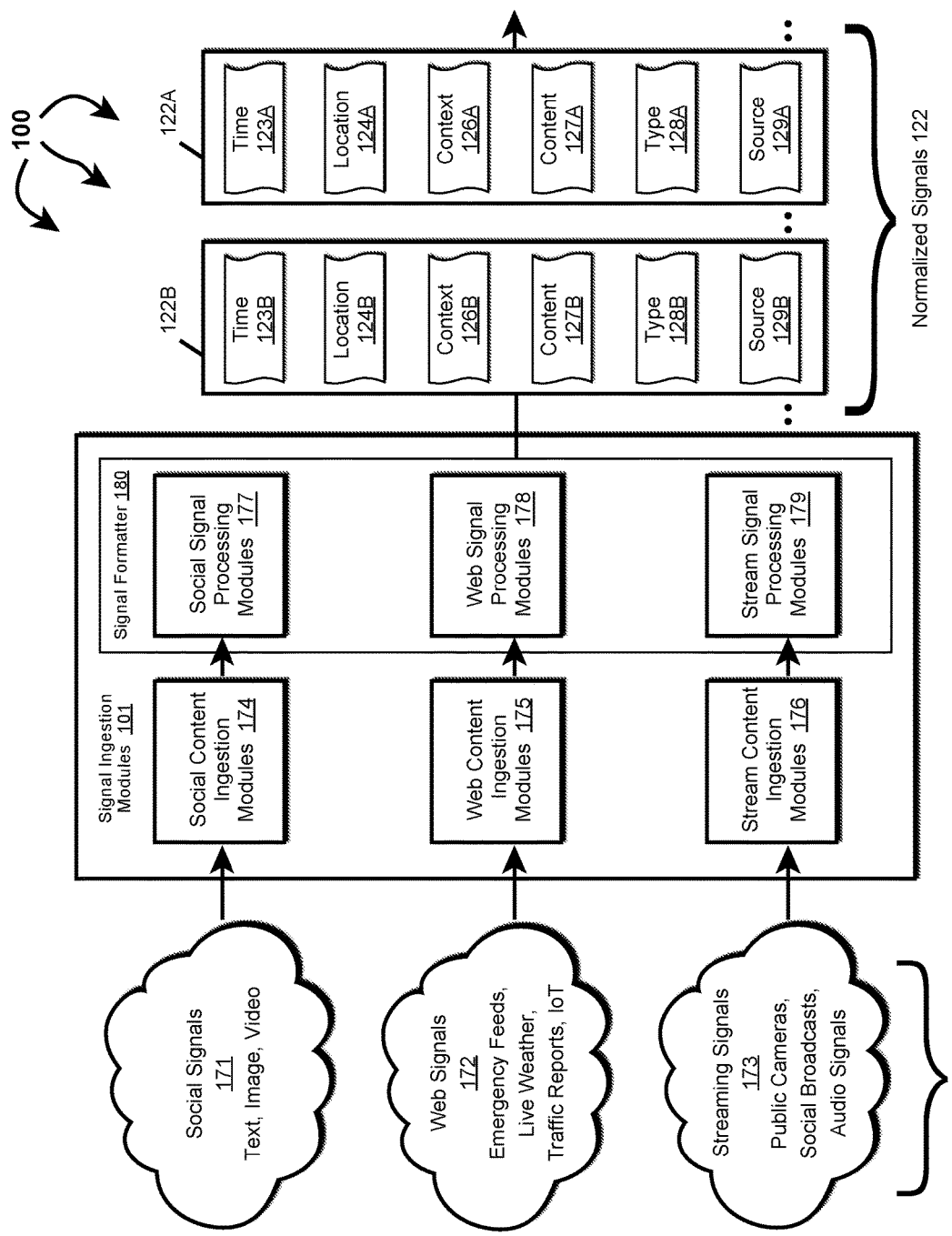
FIG. 1A illustrates an example computer architecture that facilitates normalizing ingesting signals.

Examples extend to methods, systems, and computer program products for presenting event intelligence and trends tailored per geographic area granularity.

Systems that provide information by geographic area are helpful but often provide an incomplete representation of human related events that have occurred within a geographic area under consideration. Those systems also lack functionality permitting users to view information at user specified levels of granularity, for example, ranging from a state, to a county, to a city, to a neighborhood, to a street, to an individual address, etc., with seamless transitions between different views. Providing information at an inappropriate (and also fixed) granularity hampers user experience and reduces user satisfaction. To access relevant information, a user may have to cobble together a number of different views (e.g., when views are to granular). A user may also choose to not use a system that lacks configurability, for example, when a default presentation is to coarse and cannot be altered.

Aspects of the invention provide event related information for geographic areas at specified geo cell (e.g., geohash) levels. Event related data can be combined with information from other domains to enable more intelligent decision making within those domains. The other domains can include: real estate, economic development, insurance, actuarial science, marketing, financial services, telecommunications, property tax, education, retail, travel, mobility, healthcare, child protection (amber alerts), pharmaceuticals, data related to use of scheduled narcotics (e.g., opioids) medical response types (e.g., overdoses, dispensing drugs to counteract opioids (Naloxone), etc.), regulatory prescription data for scheduled narcotics, distribution data within regions, such as, by dispensary, lockdown information, consumer fraud information, price gouging information, etc.

Consumer fraud information can rely on underlying data sources including: credit card and bank transaction data by vendor, location, and amount, census type of data in terms of higher-risk communities like elderly density, landline location by duration of service (as a proxy signal potentially of risk). Price gouging information can rely on underlying data sources including: approved rates for housing, average, seasonal, and online rates, food, other essentials (e.g., gas, water, etc.).

Lockdown information can rely on being able to quickly identify places within a perimeter which require notification and lockdown actions. Lockdown information can include multiple vectors, identification of schools (public, private, pre-schools, etc.), business & buildings, homes, etc. Identifying a perimeter for lockdown can be influenced by factors such as distance (in terms of miles and/or minutes), accessibility (whether by foot or vehicle), and risk factor.

For example, event related information can be combined with data from a real estate system to help a prospective home buyer make a more intelligent decision with respect to purchasing a home in a geographic area. As another example, event related information can be combined with locations where Naloxone was administered to make more intelligent decisions about opioid overdoses. Combined data can be graphically presented at a unifying configurable interface. Graphically presenting event related information in combination with other information at a unifying configurable interface minimizes switching focus between different applications.

Responsive to user commands, granularity can be adjusted to meaningfully present event related information integrated with other information. Graphical presentation can be tailored to a selected granularity and can vary between selected granularities. For example, event related information and other information can be graphically presented in one format at neighborhood or street granularity and presented in another different format at a county or state granularity. As a geographic granularity is changed, event related information and other information can seamlessly transition between different tailored graphical presentations.

In one aspect, event related information and other information for an area to be presented is at least partially summarized prior to presentation. Event related information and other information for adjacent areas can also be at least partially summarized. Adjacent areas can be areas a user can move focus to but that are not necessarily selected for current presentation (e.g., areas left, right, above, below, etc., a presented area). As such, event related information and other information can be at least partially pre-summarized (pre-processed) in preparation for possible presentation.

At least partially summarizing data for currently presented areas as well as adjacent areas reduces resource consumption when moving between presented areas, for example, in a map. The level of summarization can be a tailored to a selected granularity. Event related information and other information associated with larger geographic areas can be more summarized than event related information and other information associated with smaller geographic areas.

As such, overall presented graphical data (e.g., total number of icons) can be relatively stable, and possibly tuned to available computing resources. Maintaining a stable amount of graphical data minimizing possible bogging down of and/or overloading graphical capabilities, for example, when transitioning from a more granular to a less granular map view. For example, instead of presented individual icons for every accident in a state, accidents can be represented as a single icon per county indicating a total number of accidents in the country. When a user increases granularity to view an individual county in the state, less summarized graphical data can be presented.

Accordingly, presentation of event related information and other information can be seamlessly (and efficiently) transitioned when viewing changes between different geographic granularities ranging from a state, to a county, to a city, to a neighborhood, to a street, to an individual address, etc.

In other aspects, event trends are computed and presented. Presentation of event trends can be similarly tailored to geographic granularity to stabilize presentation of graphical data and minimizing possible bogging down of and/or overloading graphical capabilities. Tailoring presentation of event trends can include varying a level of summarization based on geographic granularity.

Detection of events and thus derivation of event related information can include signal ingestion. In general, signal ingestion modules ingest different types of raw structured and/or raw unstructured signals on an ongoing basis. Different types of signals can include different data media types and different data formats, including Web signals. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. The event infrastructure can similarly detect changes to events. Signal features can include: signal type, signal source, signal content, Time (T) dimension, Location (L) dimension, Context (C) dimension, other circumstances of signal creation, etc.

In one aspect, signal ingestion modules and an event detection infrastructure are integrated with components configured to record detected events per geo cell, combine event related information with other datasets, at least partially summarize event related information and other information for presentation at a specified geographic granularity, and identify trends.

A geo cell database (or other storage mechanism) includes a number geo cells and corresponding related information. For example, each geo cell entry can include a geo cell and one or more other types of supplemental information, including: corresponding latitude/longitude, street names located in an area defined by the geo cell, business names in the area defined by the geo cell, school names in the area defined by the geo cell, park names in the area defined by the geo cell, names of other public facilities in the area defined by the geo cell (e.g., monuments), names for other Areas of Interest (AOIs), image fingerprints derived from images captured in the area defined by the geo cell, etc. Each geo cell entry can also include details of previously detected events that occurred within an area defined by the geo cell. The event detection infrastructure can store detected events in association with an appropriate geo cell (or geo cells of different precisions). Geo cell precision can be sufficiently precise to distinguish between events occurring at adjacent addresses.

The event detection infrastructure can include a geo determination module. For each of one or more signals used to detect a potential event, signal content can be sent to the geo determination module. The geo determination module can include modules for processing different kinds of content including the location context, text, images, audio, and video into search terms. The geo determination module can query the geo cell databases with search terms formulated from signal content. The geo cell database can return an indication of any geo cells that include matching supplemental information. For example, if a search term includes a street name, a subset of one or more geo cells including the street name in supplemental information can be returned.

Generally, the geo determination module can listen for additional signals related to the potential event in an area defined by each of the returned geo cells (and possibly other areas defined by adjacent and/or nearby geo cells). If additional signals related to a potential event are detected, the event detection infrastructure can use any additional signals to validate an event detection.

Events associated with a geo cell can be stored back into a corresponding geo cell entry in the geo cell database. Thus, over time an historical progression of events within a geo cell can be accumulated.

A user can use a data exploration tool to explore events in combination with other domain specific data to make a more intelligent decision within a domain. A data exploration tool can include mapping components permitting a user to view a map at varied granularities. At a specified granularity, a user can view domain specific data along with previously detected events that have occurred in an area defined by one or more geo cells. Events can be viewed at a level of granularity corresponding to a maximum geo cell precision maintained in the geo cell database (e.g., geohashes of precision level 9) or at any lower precision. Thus, a user can view and seamlessly transition between views of past detected events in a state, a county, a city, a neighborhood, on a street, at a specific address, etc.

Machine learning can also be applied to past events associated with a geo cell or a collection of geo cells to determine any of: past event trends, present event trends, or future event trends. A data access module can query a geo cell database for past events associated with one or more geo cells. The geo cell database can return any previously detected events that have occurred in the one or more geo cells. Machine learning can be applied to the returned events to identify trends based on event content, event category, event description, etc. For example, machine learning can determine if crime has increased or decreased within an area defined by the one or more geo cells in the last year.

Identified trends can be presented along with event related data and other data in a view at a specified granularity. Trends can also be more or less summarized based on the specified granularity so as to not bog down or overload graphical presentation resources.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, events, search terms, geo cells, geo cell subsets, geo cell entries, user requests, event queries, geographic data, event histories, map data, domain specific data, maps, defined areas, event trends, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, events, search terms, geo cells, geo cell subsets, geo cell entries, user requests, event queries, geographic data, event histories, map data, domain specific data, maps, defined areas, event trends, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and is corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| geo hash Length/Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |

TABLE 1-continued

Example Areas at Various Geohash Precisions

| geo hash Length/Precision | width × height |
|---|---|
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or preprocess) raw signals into normalized signals to increase efficiency and effectiveness of subsequent computing activities, such as, event detection, event notification, etc., that utilize the normalized signals. For example, signal ingestion modules can normalize raw signals, including raw streaming signals, into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In additional aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 175, stream content ingestion modules 176, and signal formatter 180. Signal formatter 180 further includes social signal processing module 177, web signal processing module 178, and stream signal processing modules 179.

Streaming signals 173 can include live video and/or non-live (previously stored) video.

For each type of signal, a corresponding ingestion module and signal processing module can interoperate to normalize the signal along Time, Location, Context (TLC) dimensions. For example, social content ingestion modules 174 and social signal processing module 177 can interoperate to normalize social signals 171 into TLC dimensions. Similarly, web content ingestion modules 175 and web signal processing module 178 can interoperate to normalize web signals 172 into TLC dimensions. Likewise, stream content ingestion modules 176 and stream signal processing modules 179 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity and resource consumption of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time (dimension) 123A, location (dimension) 124A, context (dimension) 126A, content 127A, type 128A, and source 129A to event detection infrastructure 103. Similarly, signal ingestion modules 101 can send normalized signal 122B, including time (dimension) 123B, location (dimension) 124B, context (dimension) 126B, content 127B, type 128B, and source 129B to event detection infrastructure 103.

Event Detection

Figure 1B:
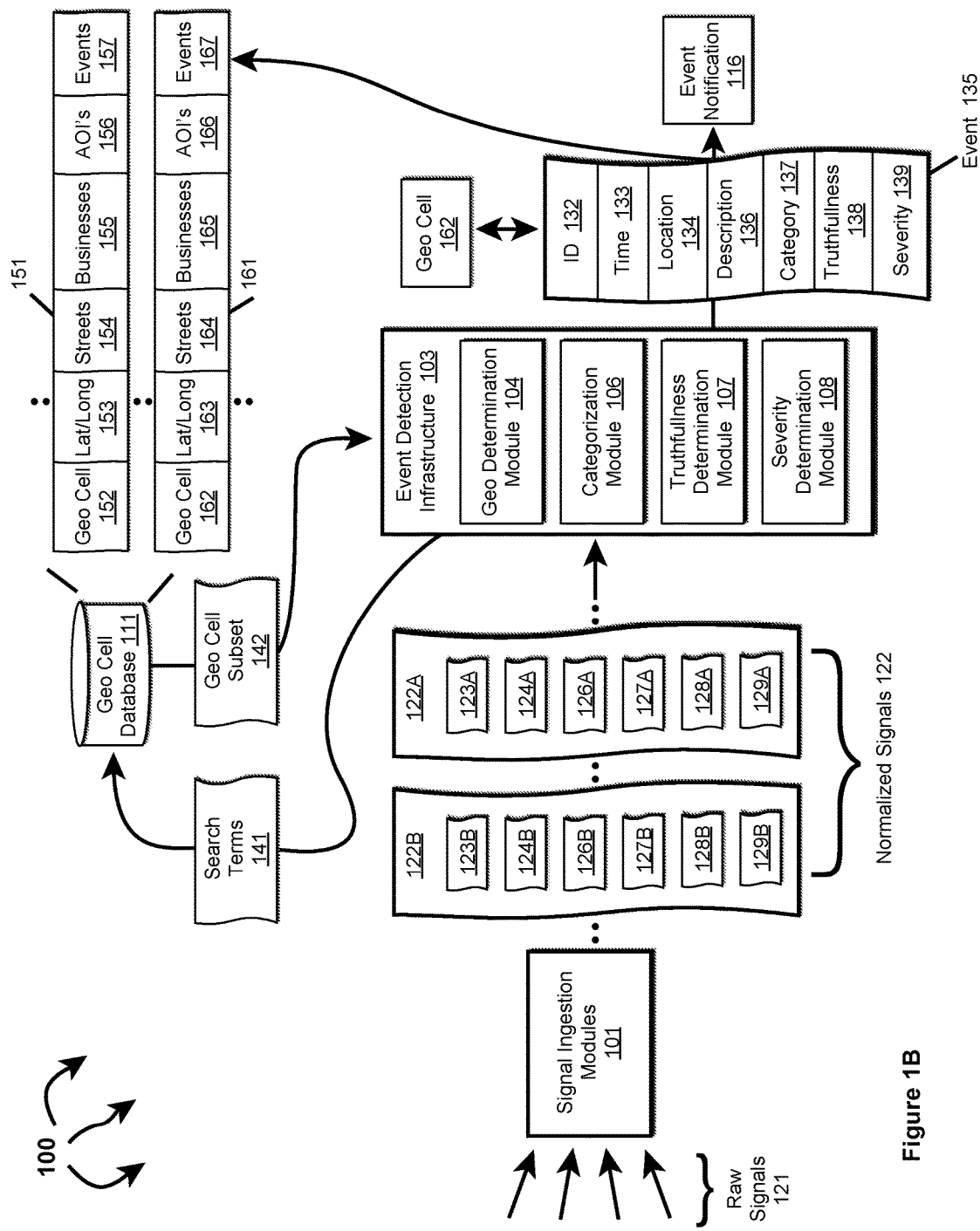
FIG. 1B illustrates an example computer architecture that facilitates detecting events from normalized signals.

FIG. 1B depicts part of computer architecture 100 that facilitates detecting events. As depicted, computer architecture 100 includes geo cell database 111 and even notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Event detection infrastructure can likewise detect changes to existing (planned and unplanned) events. Since, normalized signals are normalized to include Time, Location, and Context dimensions (vectors), event detection infrastructure 103 can handle normalized signals in a more uniform manner. Handling signals in a more uniform manner increases event detection and event change detection efficiency and effectiveness and also reduces resource consumption. For example, Time, Location, and Context vectors of different normalized signals can be compared (instead of comparing along numerous other dimensions).

Event detection infrastructure 103 can also determine an event truthfulness (e.g., erroneous detection results, detections based on tampered source data, detections of fictional or staged events), event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension and/or can be represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension and/or can be represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field). Sufficiently precise geo cells can be used to increase the practicality of storing matching content.

Geo cell database 111 can store geo cell entries in a hierarchical arrangement based on geo cell precision. As such, geo cell information of more precise geo cells is included in the geo cell information for any less precise geo cells that include the more precise geo cell.

In one aspect, modules of event detection infrastructure 103 derive search terms 141 from information in normalized signals 122. Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 134, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Figure 1C:
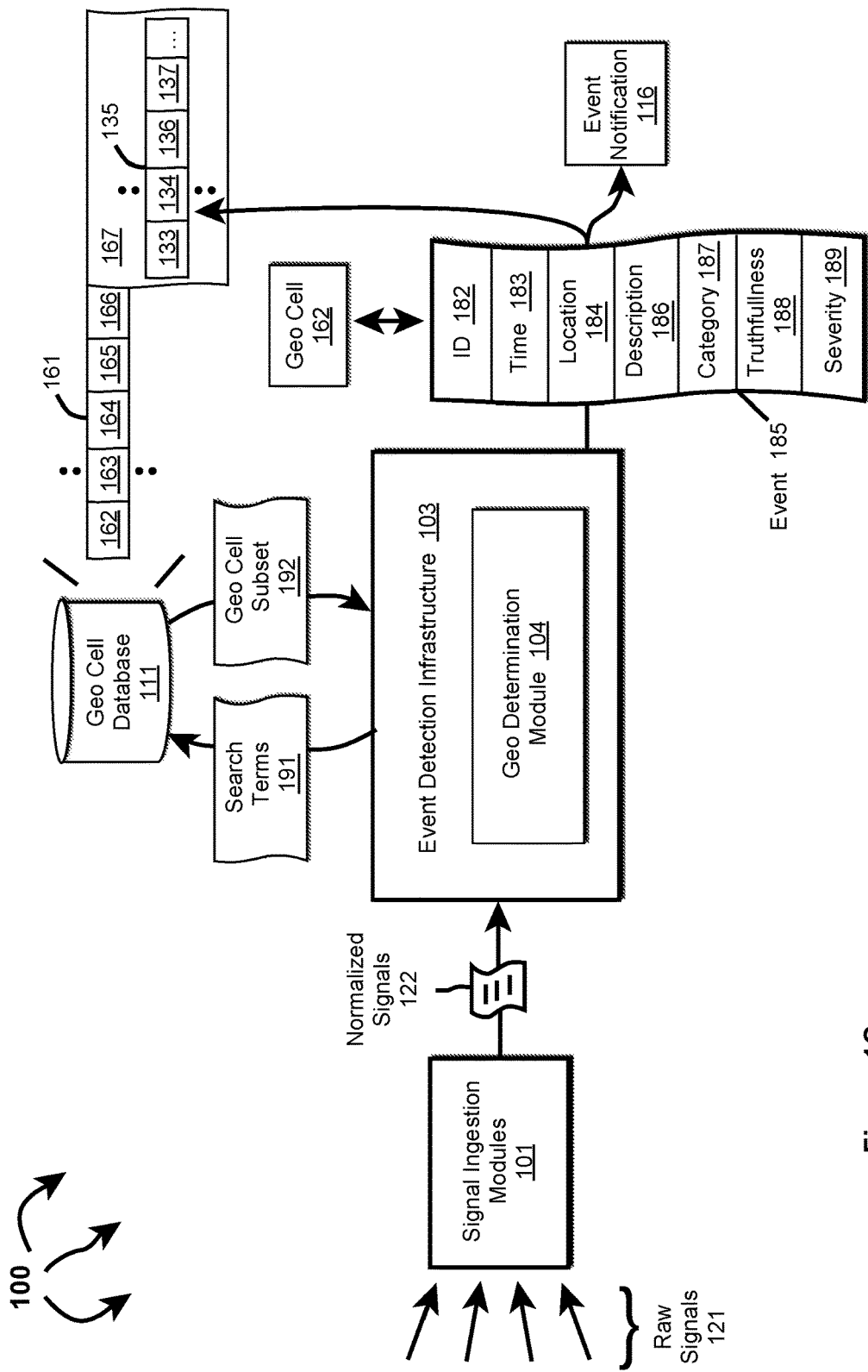
FIG. 1C illustrates an example computer architecture that facilitates adding an event to a geo cell database.

Similarly, turning to FIG. 1C, modules of event detection infrastructure 103 can derive search terms 191 from information in normalized signals 122 (e.g., at some time after event 135 was detected). Geo determination module 104 can query geo cell database 111 with search terms 191. Geo cell database 111 can identify any geo cells having supplemental information that matches search terms 141. For example, if search terms 141 include an Area of Interest (AoI) and a business name, geo cell database 111 can identify geo cells having the AoI and business name in the area defined by the geo cell. Geo cell database 111 can return any identified geo cells to geo determination module 104 in geo cell subset 192.

Geo determination module can use geo cell subset 192 to determine the location of event 185 and/or a geo cell associated with event 185. As depicted, event 185 includes event ID 182, time 183, location 184, description 186, category 187, truthfulness 188, and severity 189.

Event detection infrastructure 103 can also determine that event 185 occurred in an area defined by geo cell 162 (e.g., a geohash having precision of level 7 or level 9). For example, event detection infrastructure 103 can determine that location 184 is in the area defined by geo cell 162. As such, event detection infrastructure 103 can store event 185 in events 167 along with event 135 (i.e., historical events that have occurred in the area defined by geo cell 162).

Event detection infrastructure 103 can also send event 185 to event notification module 116. Event notification module 116 can notify one or more entities about event 185. As such, over time, detected events in geo cell 162 can be accumulated in geo cell database 111.

Figure 2:
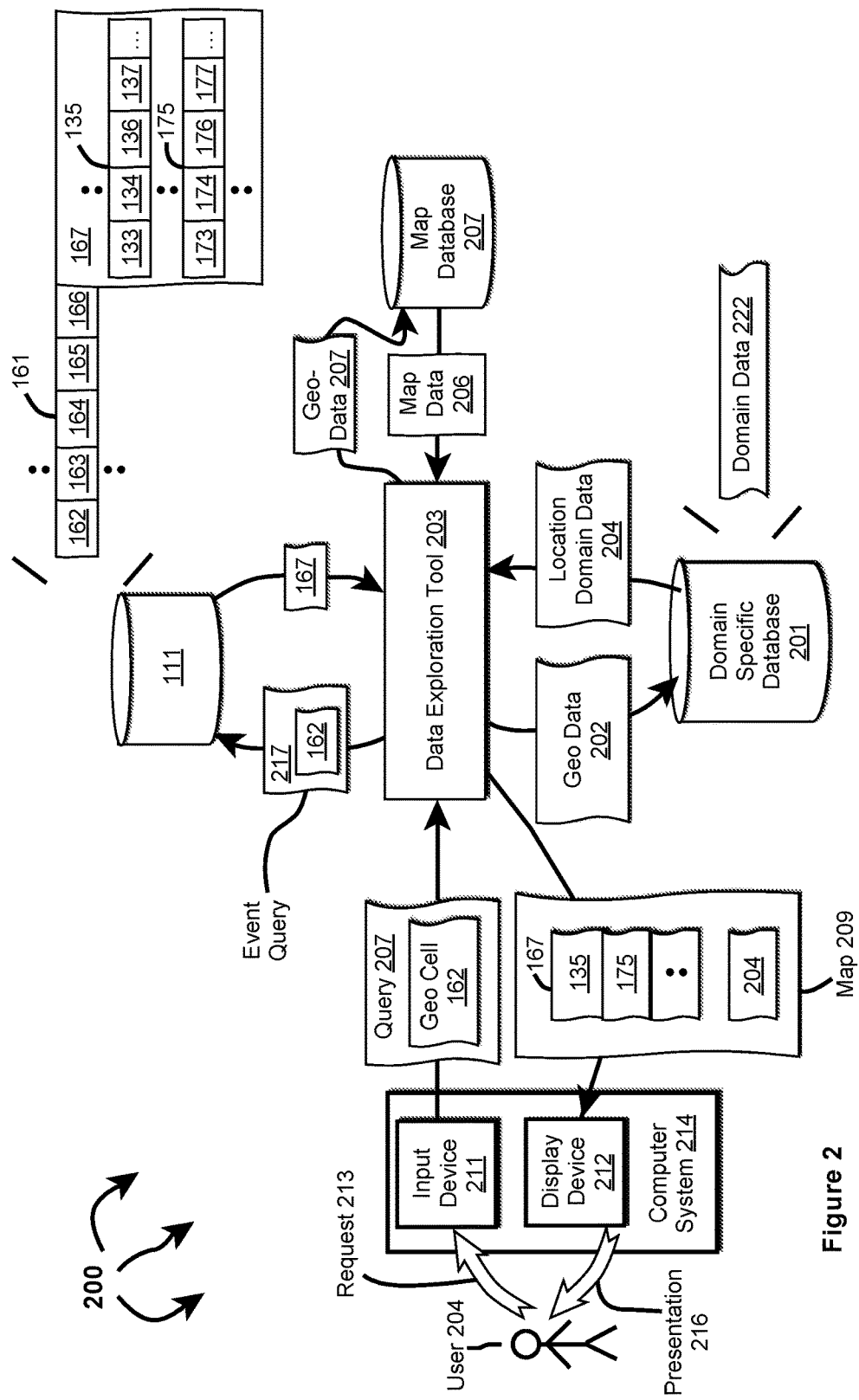
FIG. 2 illustrates an example computer architecture that facilitates presenting event related data and domain specific data tailored per geographic area granularity.

Presenting Combined Event Related Data and Domain Specific Data Tailored Per Geographic Area Granularity FIG. 2 illustrates an example computer architecture 200 that facilitates presenting combined event related data and domain specific data tailored per geographic area granularity. As depicted, computer architecture 200 includes domain specific database 201, data exploration tool 203, map database 207, and computer system 214. Computer system 214 includes input device 211 (e.g., mouse, keyboard, etc.) and display device 212 (e.g., monitor, television, etc.). In one aspect, input device 211 and display device 212 are the same device, for example, a touch screen.

Domain specific database 201 can include data related to a domain, such as, for example, real estate, economic development, insurance, telecommunications, property tax, education, retail, actuarial, or financial, etc. In one aspect, computer architecture 200 includes one or more domain specific databases in addition to domain specific database 201. Each additional domain specific database can include data related to a domain. Thus, data exploration tool 203 can access multiple domain specific databases.

In one aspect, each domain specific database stores domain specific data for a different domain. Thus, data exploration tool 203 can combine event related data with domain specific data from a plurality of different domains. In another aspect, a plurality of domain specific databases store domain specific data for the same domain. Thus, data exploration tool 203 can also combine event related data with domain specific data from a plurality of different domain specific databases in the same domain.

Map database 207 includes map data for generating maps at and between any of a number of specified granularities, such as, country, state, county, city, neighborhood, street, address, etc.

In general, data exploration tool 203 can receive a user query including one or geo cells (of the same or different precisions) defining an area from a user computer system. Data exploration tool 203 can formulate an event query corresponding to the user query. Data exploration tool 203 can submit the event query to geo cell database 111 to request an event history in each of the one or more geo cells. Geo cell database 111 can return an event history, including one or more previously detected events, for each of the one or more geo cells to data exploration tool 203. Data exploration tool 203 can also query map database 207 with the one or more geo cells or with other corresponding geographic data. Map database 207 can return map data corresponding to the one or more geo cells or other geographic data.

Data exploration tool 203 can also query domain specific database 201 (and possibly other domain specific databases) with the one or more geo cells or with other corresponding geographic data. Domain specific database 201 and any other domain specific databases can return domain specific data corresponding to one or more geo cells or other geographic data.

Data exploration tool 203 can integrate event related data from previously detected events, domain specific data from one or more domains, and map data into a map of the area defined by the one or more geo cells. Data exploration tool 203 can at least partially summarize event related data and domain specific data for a defined area based on the geographic granularity of the defined area. At least partially summarizing event related data and domain specific data regulates the volume of presented graphical data and stabilizes resource consumption at the user computer system.

Data exploration tool 203 can also pre-summarize (pre-process) event related information and other information in areas adjacent to a defined area. In response to receiving a defined area, data exploration 203 can compute areas adjacent to the defined area. Adjacent areas can be areas a user can move focus to but that are not necessarily selected for current presentation (e.g., areas left, right, above, below, etc., a presented area). In response to a user query, data exploration tool 203 can also query geo cell database 111 for event histories in adjacent areas and query one or more domain specific databases for domain data in adjacent areas. Data exploration tool 203 can pre-summarize event related data and domain data from adjacent areas based on geographic granularity of the defined area. Thus, if a user shifts focus to an adjacent area, at least partially summarized event related data and domain data can be efficiently presented in response to a user-initiated focus shift.

In response to shifting focus to an adjacent area, data exploration tool 203 can consider the shifted to adjacent area the new defined area. Data exploration tool 203 can compute new areas adjacent to the new defined area. Data exploration tool 203 can query geo cell database 111 for event histories in new adjacent areas, query one or more domain specific databases for domain data in new adjacent areas, and query map database 207 for additional map data. Data exploration tool 203 can pre-summarize event related data and domain data from new adjacent areas based on geographic granularity of the new defined area. Thus, data exploration tool 203 attempts to have pre-summarized (pre-computed) and appropriately tailored related information and other information continually available as a user shifts focus within a map.

In response to a user change to a different geographic granularity, data exploration tool 203 can query geo cell database 111, one or more domain specific databases, and map database 207. Data exploration tool 203 can summarize and pre-summarize event related data and domain specific data for presentation at the different geographic granularity, including preparation of event related data and domain specific data in adjacent areas. As focus shifts between different areas at the different geographic granularity, data exploration tool 203 attempts to have pre-summarized (pre-computed) and appropriately tailored related information and other information continually available within a map.

Thus, if a user changes geographic granularity, at least partially summarized event related data and domain data can be efficiently presented.

Figure 3:
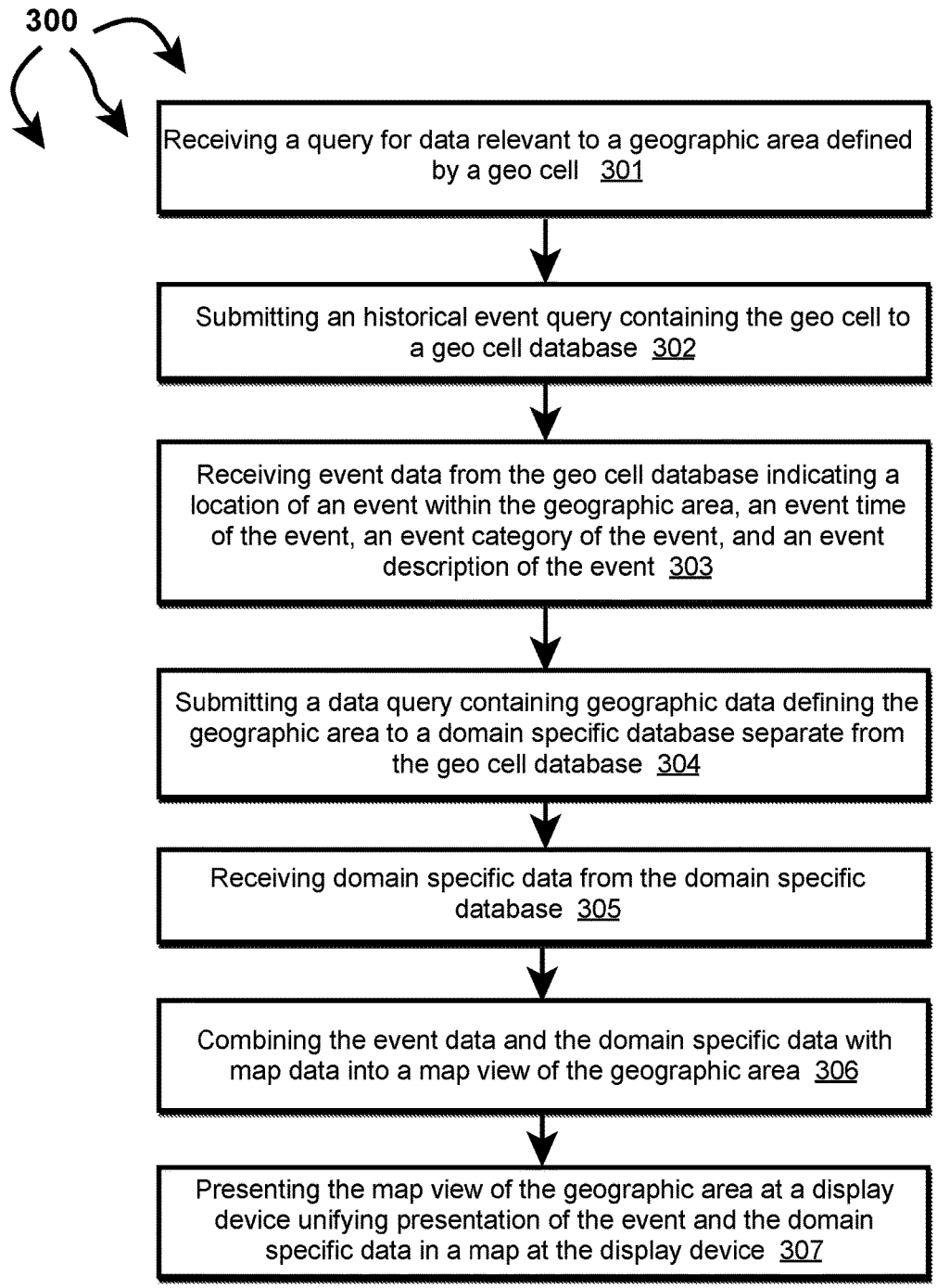
FIG. 3 illustrates a flow chart of an example method for presenting event related data and domain specific data tailored per geographic area granularity.

FIG. 3 illustrates a flow chart of an example method 300 for presenting tailored event related data and domain specific data per geographic area granularity. Method 300 will be described with respect to the components and data of computer architecture 200.

Method 300 includes receiving a query for data relevant to a geographic area defined by a geo cell (301). For example, user 204 can formulate request 213 at input device 211. Request 213 can request event related data and domain specific data relevant to a geographic area defined by geo cell 162. Computer system 214 can convert request 213 into query 207, including geo cell 162. Computer system 214 can send query 207 to data exploration tool 203. Data exploration tool 203 can receive query 207 from computer system 214.

Method 300 includes submitting an historical event query containing the geo cell to a geo cell database (302). For example, data exploration tool 203 can submit historical event query 217 to geo cell database 111. Geo cell database can match geo cell 162 to geo cell entry 161. Geo cell database can return events 167, including events 137 and 175, to data exploration tool 203. Method 300 includes receiving event data from the geo cell database indicating a location of an event within the geographic area, an event time of the event, an event category of the event, and an event description of the event (303). For example, data exploration tool 203 can receive events 167, including events 137 and 175, from geo cell database 111. Each event can include a location, a time, a category, and a description. For example, event 135 includes location 134, time 133, category 137, and description 136. Similarly, event 185 includes location 184, time 183, category 187, and description 186.

Method 300 includes submitting a data query containing geographic data defining the geographic area to a domain specific database separate from the geo cell database (304). For example, data exploration tool 203 can submit geographic data 202 to domain specific database 201. In one aspect, geographic data 202 is geo cell 162. In another aspect, data exploration tool 203 converts geo cell 162 into another geographical format compatible with domain specific database 201. Domain specific database 201 can search domain data 222 for domain specific data corresponding to the area defined by geo cell 162. Domain specific database 201 can determine that location domain data 204 corresponds to geo cell 162. Domain specific database can send location domain data 204 to data exploration tool 203. Method 300 incudes receiving domain specific data from the domain specific database (305). For example, data exploration tool 203 can receive location domain data 204 from domain specific database 201.

Data exploration tool 203 can also query map database 207 for relevant map data. For example, data exploration tool 203 can submit geographic data 207 to domain map database 203. In one aspect, geographic data 207 is geo cell 162. In another aspect, data exploration tool 203 converts geo cell 162 into another geographical format compatible with map database 207 (which may or may not be compatible with domain specific database 201). Map database 207 identifies map data 206 corresponding to geo cell 162. Map database 207 returns map data 206 to data exploration tool 203.

Method 300 includes combining the event data and the domain specific data with map data into a map view of the geographic area (306). Method 300 includes presenting the map view of the geographic area at a display device unifying presentation of the event and the domain specific data in a map at the display device (307). For example, data exploration tool 203 can combine data form events 167 and location domain data 204 with map data 206 into map 209 of the geographic area. Data exploration tool 203 can at least partially summarize data in events 167 and/or location domain data 204 based on the geographic granularity of map 209 (the area defined by geo cell 162) to regulate the amount of graphical data presented at computer system 214. Map 209 can unify presentation of data from events 167 and location domain data 204. Data exploration tool 203 can send map 209 to computer system 214. Display device 212 can present 216 map 209 to user 204.

Subsequently, user 204 can interact with map 209 to alter the defined area. For example, user 204 can manipulate user interface controls to request viewing or a more granular (e.g., smaller) area or less granular (e.g., larger) area. One or more geo cells corresponding to the altered defined area can be sent to data exploration tool 203. Data exploration tool can issue additional queries to geo cell database 111, domain specific database 201, and map database 207 for data corresponding to the altered defined area. Geo cell database 111, domain specific database 201, and map database 207 can return data corresponding to the altered defined area back to data exploration tool 203. Data exploration tool 203 can formulate a new map for the altered defined area.

Data exploration tool 203 can also change summarization of event related data and/or domain data to align with the altered defined area and computing resources of computer system 214. For example, data exploration tool 203 can increase summarization when the altered defined area is a less granular (e.g., larger) area than the defined area. On the other hand, data exploration tool 203 can decrease summarization when the altered defined area is a more granular (e.g., smaller) area than the defined area.

Presenting Event Trends Tailored Per Geographic Area Granularity

Figure 4:
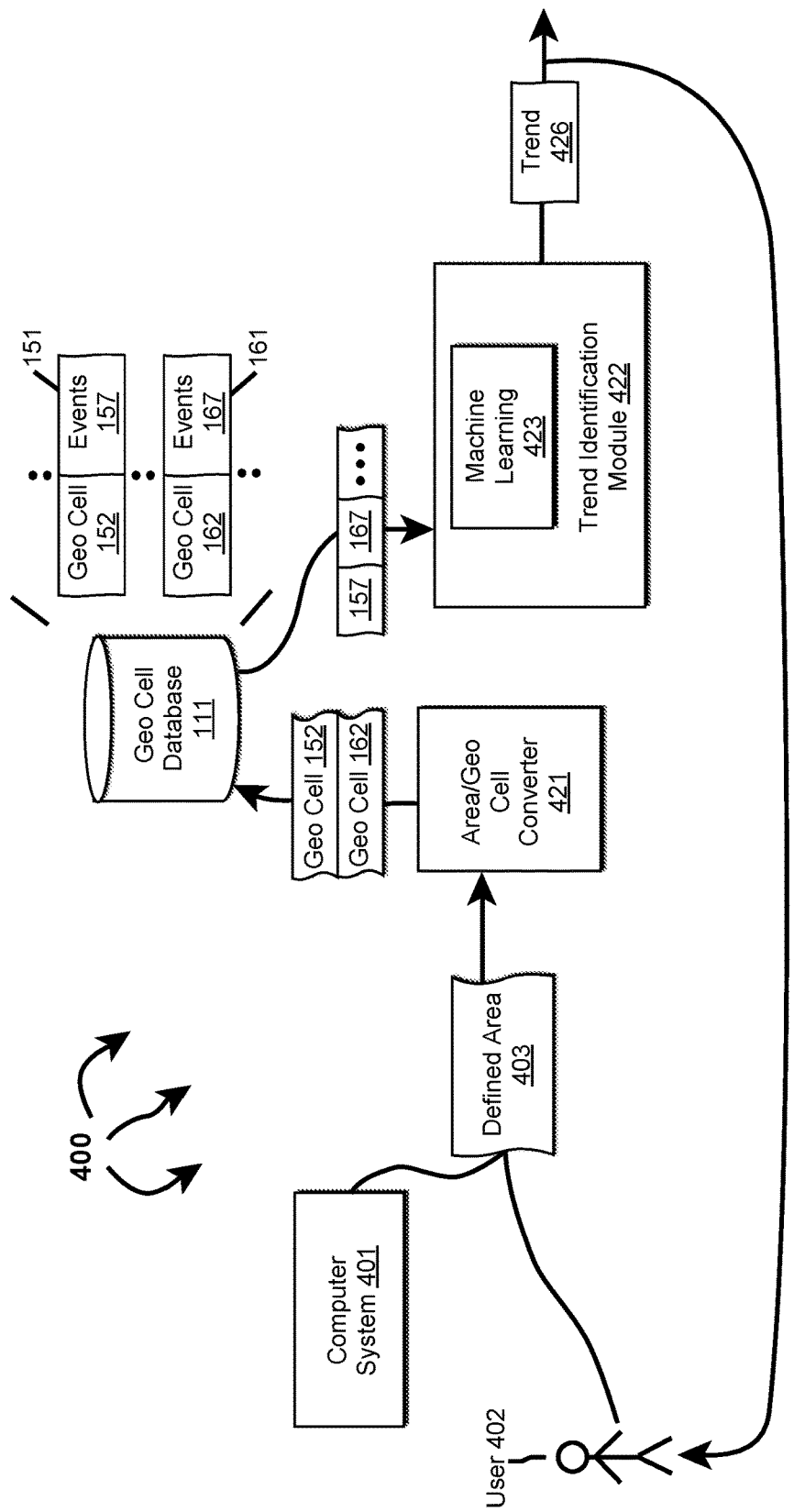
FIG. 4 illustrates an example computer architecture that facilitates presenting event trend data tailored per geographic area.

FIG. 4 illustrates an example computer architecture 400 that facilitates presenting event trend data tailored per geographic area. In another aspect, a user or another computer system is interested in event trends within a specified area. As described, a defined area can include parts of areas defined by one or more (or a collection of) geo cells.

Area/geocell converter 421 received a defined area (e.g., bounded area selected on a map) from a computer system. Area/geocell converter 421 can convert the defined area into corresponding geo cells. Area/geo cell converter 421 can submit the corresponding geo cells to geo cell database 111.

Geo cell database 111 can return event histories for the corresponding geo cells to trend identification module 422. Trend identification module 422 can apply machine learning 423 to the contents (e.g., event time, event location, event category, event description, etc.) of returned events to identify trends, including past trends, present trends, and future trends. A trend can indicate an increase or decrease in events in a particular event category, such as, for example, accidents, fires, police response, etc.

Machine learning 423 can use statistical techniques to learn how to better identify trends (i.e., progressively improve in trend identification). In one aspect, machine learning 323 makes data-driven predictions/decisions based on a model created from sample event inputs. Machine learning 323 can also utilize predictive analytics to analyze event contents and make trend predictions, including predicting possible future trends.

Trend identification module 422 can at least partially summarize trends based on the geographic granularity of a defined area. Trend identification module 422 can used techniques similar to data exploration to summarize and pre-summarize data based on the geographic granularity of a defined area. In one aspect, area/geocell converter 421 and/or trend identification module 422 are integrated with and/or included in data exploration tool 203. Thus, identified trends for a defined area can be presented along with event related data and domain data for the defined area on a map.

Figure 5:
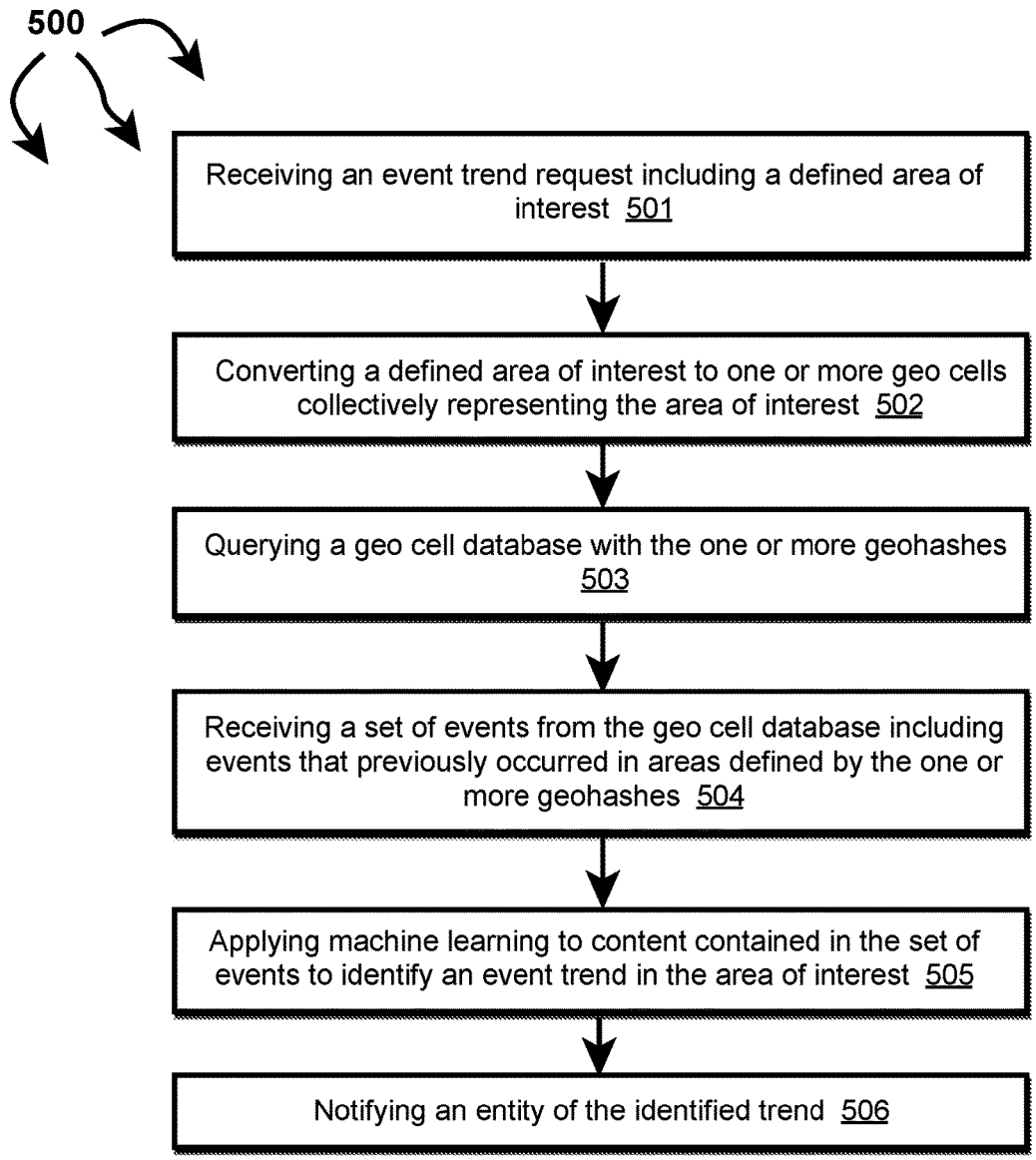
FIG. 5 illustrates a flow chart of an example method for presenting event trend data tailored per geographic area.

FIG. 5 illustrates a flow chart of an example method 500 for presenting event trend data tailored per geographic area. Method 500 will be described with respect to the components and data of computer architecture 400.

Method 500 includes receiving an event trend request including a defined area of interest (501). For example, user 402 and/or computer system 401 can send defined area 403 to area/geocell converter 421. Area/geocell converter 421 can receive defined area 403 from user 402 and/or computer system 401.

Method 500 includes converting the defined area of interest to one or more geo cells collectively representing the area of interest (502). For example, area/geocell converter 421 can convert defined area 403 into geo cells 152 and 162. Method 500 includes querying a geo cell database with the one or more geohashes (503). For example, area/geocell converter 421 can query geo cell database 111 with geo cells 152 and 162. Geo cell database 111 can match geo cells 152 and 162 with events 157 and 167 respectively.

Method 500 includes receiving a set of events from the geo cell database including events that previously occurred in areas defined by the one or more geohashes (504). For example, geo cell database 111 can send events 157 and 167 to trend identification module 422. Trend identification module 422 can receive events 157 and 167 from geo cell database 111.

Method 500 includes applying machine learning to content contained in the set of events to identify an event trend in the area of interest (505). For example, trend identification module 422 can apply machine learning 423 to content (e.g., event time, event location, event category, event description, etc.) contained in events 157 and 167 to identify trend 426 in defined area 403. Based on the geographic granularity of defined area 403, trend identification module 422 can at least partially summarize data in trend 426 to regulate the amount of graphical data presented at a computer system. In one aspect, data in trend 426 is summarized similarly to event related data and domain data to be presented in a map.

Method 500 includes notifying an entity of the identified trend (506). For example, trend identification module can send trend 626 to computer system 401 and/or to user 402.

In one aspect, (any of the described types of) domain data from a domain specific database can be combined with a set of events to identify combined trends, for example, trends fusing event related data with one or more of: data related to opioid use and overdoses, amber alerts, lockdowns, etc. Trend identification module 422 can be configured with appropriate modules (e.g., artificial intelligence, machine learning, heuristics, etc.) to identify and compute combined trends. Combined trends can be at least partially summarized to regulate the amount of graphical data presented at a computer system.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
  detecting a potential event from one or more normalized signals;
  querying a geo cell database with location search terms derived from the one or more normalized signals, the geo cell database mapping each of a plurality of geo cells to objects physically located in an area defined by the geo cell;
  receiving a list of geo cells from the geo cell database, each geo cell in the list of geo cells matching the location search terms within a specified margin of error;
  for each geo cell in the list of geo cells, monitoring for additional signals related to the potential event within the geo cell;
  receiving an additional signal related to the potential event within a geo cell listening distance of a geo cell in the list of geo cells;
  validating the potential event as an event;
  storing the event in the geo cell database;
  receiving a request for data relevant to an area defined by another geo cell;
  submitting an historical event query containing the other geo cell to the geo cell database;
  receiving event data from the geo cell database indicating a location of the event within the defined area, an event time of the event, an event category of the event, and an event description of the event;
  submitting a data query containing geographic data defining the defined area to a domain specific database separate from the geo cell database;
  receiving domain specific data from the domain specific database;
  at least partially summarizing a combination of the event data and the domain specific data with map data based on the geographic granularity of the defined area into a map view of the defined area; and
  presenting the map view of the defined area at a display device unifying presentation of the event data and the domain specific data in a map at the display device.

2. The method of claim 1, wherein the specified domain is one of: real estate, economic development, insurance, actuarial, or financial.

3. The method of claim 1, further comprising:
  at least partially summarizing another combination of the event data and the domain specific data with map data for an area adjacent to the defined area;
  receiving a user command shifting focus of the map view to the adjacent area; and
  presenting the map view of the adjacent area at the display device.

4. The method of claim 1, further comprising:
  receiving a user command changing the geographic granularity to a new geographic granularity;
  changing the amount of summarization of the combination of the event data and the domain specific data based on the new geographic granularity; and
  presenting the map view of the defined area at a display device with the changed amount of summarization.

5. The method of claim 1, further comprising computing an event trend for the defined area; and
  wherein presenting the map view of the defined area at a display device comprises presenting the event trend at the display device.

6. The method of claim 5, wherein computing an event trend for the defined area comprises computing one of: a past trend, a present trend, or future trend.

7. The method of claim 1, wherein receiving domain specific data from the domain specific database comprises receiving opioid use related data; and
  wherein at least partially summarizing a combination of the event data and the domain specific data with map data comprises at least partially summarizing a combination of the event data and the opioid use related data with map data.

8. The method of claim 1, wherein receiving domain specific data from the domain specific database comprises receiving amber alert related data; and
  wherein at least partially summarizing a combination of the event data and the domain specific data with map data comprises at least partially summarizing a combination of the event data and the amber alert related data with map data.

9. The method of claim 1, wherein receiving domain specific data from the domain specific database comprises accessing opioid use related data; and
  wherein presenting the map view of the defined area at a display device comprises unifying presentation of the event and the opioid use related data in the map view.

10. The method of claim 1, wherein receiving domain specific data from the domain specific database comprises accessing amber alert related data; and
  wherein presenting the map view of the defined area at a display device comprises unifying presentation of the event and the amber alert related data in the map view.

11. A computer system comprising:
  a processor;
  system memory coupled to the processor and storing instructions configured to cause the processor to:
    detect a potential event from one or more normalized signals;
    query a geo cell database with location search terms derived from the one or more normalized signals, the geo cell database mapping each of a plurality of geo cells to objects physically located in an area defined by the geo cell;
    receive a list of geo cells from the geo cell database, each geo cell in the list of geo cells matching the location search terms within a specified margin of error;
    for each geo cell in the list of geo cells, monitor for additional signals related to the potential event within the geo cell;
    receive an additional signal related to the potential event within a geo cell listening distance of a geo cell in the list of geo cells;
    validate the potential event as an event;
    store the event in the geo cell database;
    receive a request for data relevant to an area defined by another geo cell;
    submit an historical event query containing the other geo cell to the geo cell database;
    receive event data from the geo cell database indicating a location of the event within the defined area, an event time of the event, an event category of the event, and an event description of the event;

submit a data query containing geographic data defining the defined area to a domain specific database separate from the geo cell database;

receive domain specific data from the domain specific database;

at least partially summarize a combination of the event data and the domain specific data with map data based on the geographic granularity of the defined area into a map view of the defined area; and present the map view of the defined area at a display device unifying presentation of the event and the domain specific data in a map at the display device.

12. The computer system of claim 11, further comprising instructions configured to:

ingest one or more raw signals; and format the one or more raw signals into the one or more normalized signals.

13. The computer system of claim 12, wherein instructions configured to format the one or more raw signals into the one or more normalized signals comprise instructions configured to format a raw signal into a normalized signal including a Time, a Location, and a Context.

14. The computer system of claim 11, wherein instructions configured to receive domain specific data from the domain specific database comprise instructions configured to access opioid use related data; and wherein instructions configured to present the map view of the defined area at a display device comprise instructions configured to unify presentation of the event and the opioid use related data in the map view at the display device.

15. The computer system of claim 11, wherein instructions configured to receive domain specific data from the domain specific database comprise instructions configured to access amber alert related data; and wherein instructions configured to present the map view of the defined area at a display device comprise instructions configured to unify presentation of the event and the data related to the amber alert in the map view at the display device.

16. The computer system of claim 11, further comprising instructions configured to compute an event trend for the defined area; and wherein instructions configured to present the map view of the defined area at a display device comprise instructions configured to present the event trend at the display device.

17. The computer system of claim 11, wherein instructions configured to compute an event trend for the defined area comprise instructions configured to compute one of: a past trend, a present trend, or future trend.

* * * * *